United States Patent [19]

Kamlukin et al.

[11] Patent Number: 4,787,646
[45] Date of Patent: Nov. 29, 1988

[54] RIDING MOWER CHASSIS WITH FLOATING STEERABLE REAR WHEELS

[75] Inventors: Igor Kamlukin; John W. Schanz, both of Mequon, Wis.

[73] Assignee: Simplicity Manufacturing, Inc., Port Washington, Wis.

[21] Appl. No.: 47,870

[22] Filed: May 7, 1987

[51] Int. Cl.[4] .............................................. A01D 35/26
[52] U.S. Cl. ................................... 280/95 R; 56/15.8; 56/DIG. 22; 280/99
[58] Field of Search .................. 280/91, 98, 99, 95 R, 280/95 A, 267, 269; 56/6, 7, DIG. 22, 15.3, 15.7, 15.8; 180/53.7, 53.1

[56] References Cited

U.S. PATENT DOCUMENTS

| | | | |
|---|---|---|---|
| 913,198 | 2/1909 | Carter | 280/95 R |
| 2,651,526 | 9/1953 | Eubanks | 280/99 |
| 2,924,928 | 2/1960 | Rhoades et al. | 56/15.8 |
| 3,250,064 | 5/1966 | Kamlukin | 56/15.3 |
| 4,325,211 | 4/1982 | Witt et al. | 56/DIG. 22 |

FOREIGN PATENT DOCUMENTS 350006 3/1919 Fed. Rep. of Germany .... 280/95 R
170671 10/1983 Japan ................................... 280/91

Primary Examiner—David M. Mitchell
Assistant Examiner—Karin L. Ferriter
Attorney, Agent, or Firm—James E. Nilles

[57] ABSTRACT

The riding mower chassis of this invention has laterally spaced front traction wheels, attachment fittings for a mower that rides in front of those wheels, and laterally spaced rear wheels that can float up and down to accommodate terrain irregularities, For such floating a rear axle has at its midpoint a pivot connection with the frame whereby its ends can swing up and down, and the rear wheels are mounted on its ends for rotation and for swiveling relative to it. Swiveling of the rear wheels is controlled by an operator seated on the chassis from a steering wheel at its front. A pair of cable stretches that have their front ends connected with the steering wheel shaft extend rearwardly at the underside of the chassis frame to connections with a steering linkage on the rear axle. The cable stretches are guided past transmission elements on the underside of the chassis in guide tubes in which they are lengthwise slidable, but their rear portions are unconfined for flexing that accommodates swinging of the rear axle.

12 Claims, 4 Drawing Sheets

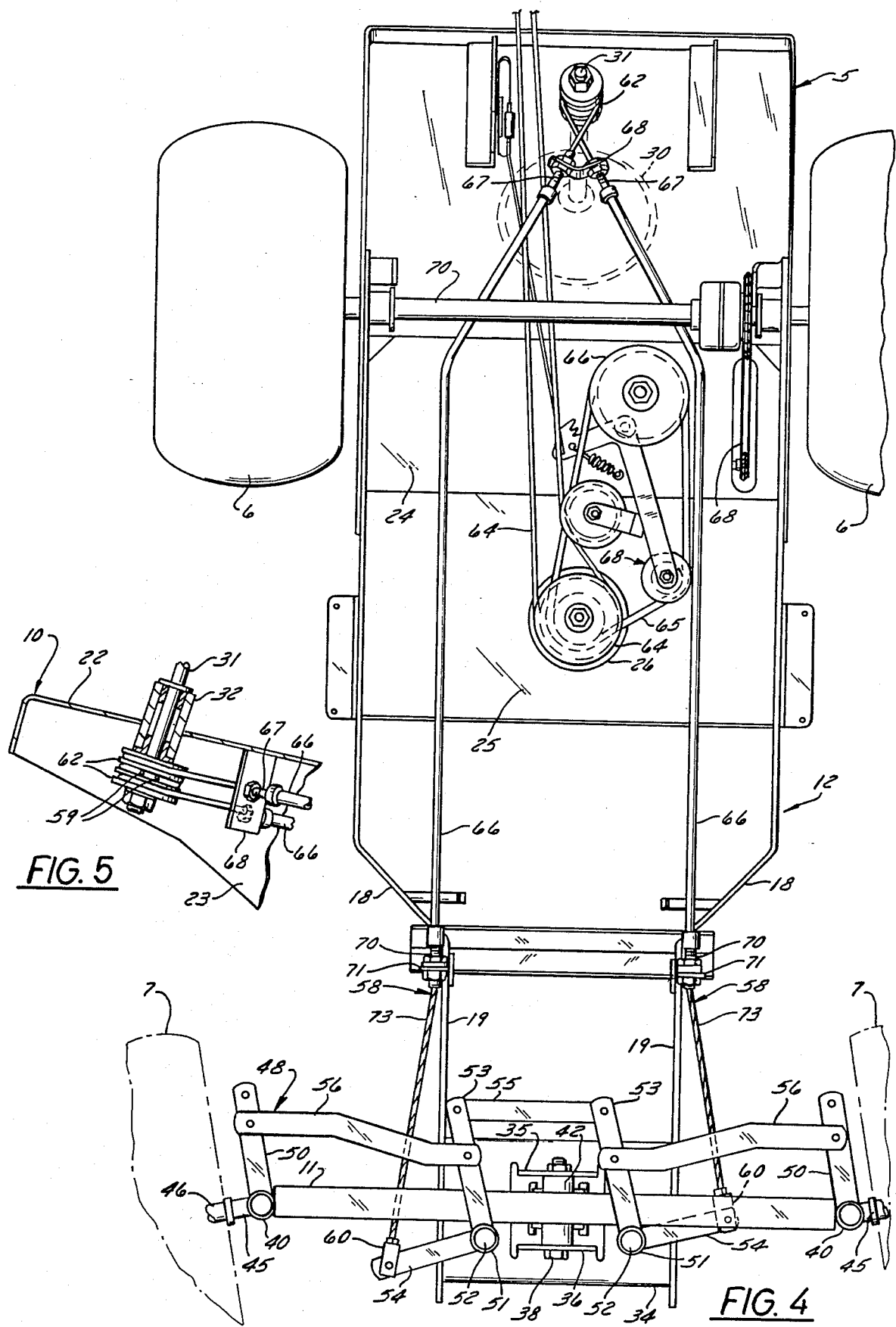

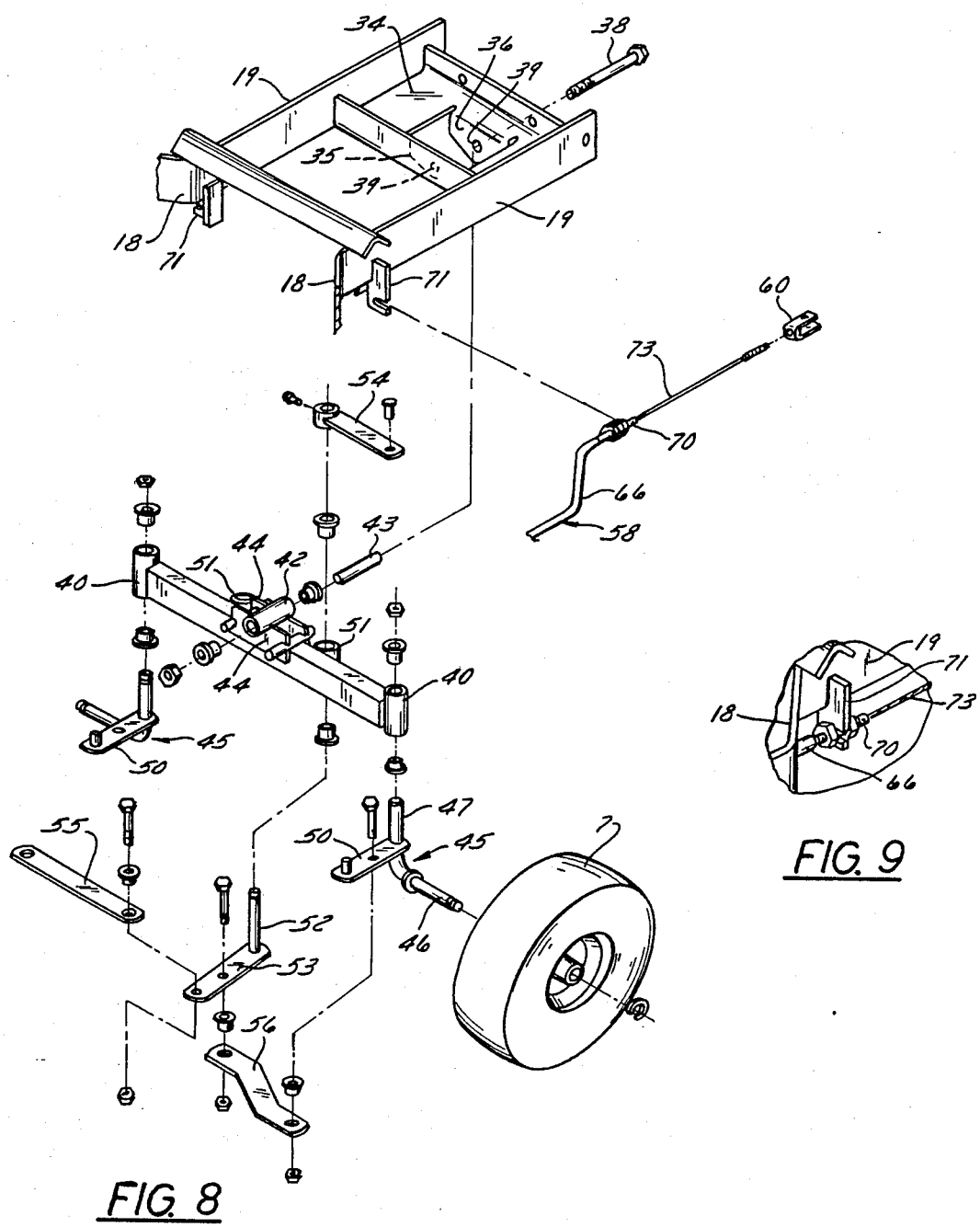
FIG. 8
FIG. 9
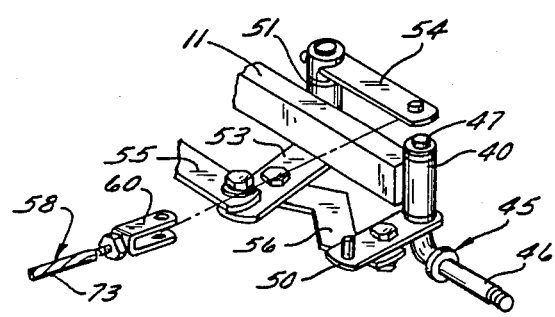
FIG. 10

RIDING MOWER CHASSIS WITH FLOATING STEERABLE REAR WHEELS

FIELD OF THE INVENTION

This invention relates to improvements in a riding mower chassis that has laterally spaced front traction wheels, an engine mounted between the front wheels and rear wheels, an operator's seat over the engine, and attachment means for a mower that is disposed in front of the front wheels; and the invention is more particularly concerned with improvements in such a chassis that has laterally spaced, steerable rear wheels which are displaceable up and down relative to the chassis so that all of the wheels maintain ground engagement on irregular terrain, said improvements providing simple, reliable and inexpensive means for controlling steering of the rear wheels from a manually operated steering controller near the front of the chassis.

BACKGROUND OF THE PRIOR ART

U.S. Pat. Nos. 4,395,865 and 4,429,515, both to Davis, Jr., disclose a riding mower chassis for a front mounted mower, which chassis has laterally spaced front traction wheels and a castering dual rear wheel that swivels about a vertical axis intersecting the longitudinal centerline of the chassis. Each of the front traction wheels is driven by its own hydraulic motor, and these motors are independently controllable from a pair of levers accessible to the operator. The disclosed arrangement provides the machine with a so-called zero turning radius whereby the front mounted mower can be moved virtually sideward. The attainment of such extreme maneuverability is expensive because of the need for a hydraulic system that must include a fluid pump, the two hydraulic motors, and control valves for the motors. For many users, therefore, the cost of this machine is not justified by its maneuverability advantages, which are needed only in special situations. Furthermore, the machine may have a tendency to tip over on relatively steep slopes, owing to its tricycle wheel arrangement. It is probable, too, that most users of a riding mower would prefer to steer it with the familiar steering wheel, which can be manipulated with one hand, rather than with a pair of steering levers which present an unfamiliar arrangement that they must learn to operate.

U.S. Pat. No. 4,384,443 discloses a riding mower chassis for a group of reel mowers, having laterally spaced front traction wheels and laterally spaced steerable rear wheels, the steering of which is controlled from a steering wheel at the front of the chassis. The mowers are hydraulically driven, and the hydraulic system provides for driving the front wheels and also for transmitting steering inputs from the steering wheel to the rear wheels. Since the hydraulic system was needed in this machine for other purposes, it was available to solve the problem of transmitting steering inputs along substantially the whole length of the chassis, but in a machine wherein the traction wheels and mower can be driven through inexpensive mechanical transmissions, it would obviously be impractical to provide a hydraulic system merely for steering control.

On a mower-carrying chassis having laterally spaced steerable wheels as well as laterally spaced traction wheels, the steerable wheels are preferably arranged for limited up and down movement relative to the chassis, so that all four wheels will remain engaged with the ground on irregular terrain, to ensure good driving and steering traction. For such up and down displacement the steerable wheels are connected with the chassis frame by means of parallelogram linkages, as disclosed in U.S. Pat. No. 4,416,109, or—as is more usual—are mounted on opposite ends of an axle that is pivoted to the chassis at its midpoint to swing about a central fore-and-aft extending axis. Pivoted axle arrangements are disclosed, for example, in U.S. Pat. Nos. 2,924,928, 3,250,064 and—in a somewhat unusual arrangement—in U.S. Pat. No. 3,440,740. In all of these cases the steerable wheels that had such so-called floating mountings were at the front of the chassis, and since the steering wheel or the like was directly over those wheels, or nearly so, it was possible to provide sturdy, simple and compact means for transmitting steering inputs to those wheels from the manually actuated steering controller.

With a front mounted mower, the arrangement comprising front traction wheels and rear steerable wheels provides for a significantly shorter turning radius than the more conventional rear wheel drive, even though it does not afford the zero-radius turning capability of machines having a castered rear wheel.

One might assume that there would be no great problem in providing a mechanical connection between steerable rear wheels and a steering controller at the front of the chassis. Indeed, U.S. Pat. No. 4,325,211, which contains a rather sketchy disclosure of a front drive-rear steered mower-carrying unit says: "Steering wheel 18 is coupled to rear wheels 14 through any standard linkage." But there is no indication that the steerable rear wheels of this unit were floatingly mounted, and it will be apparent that floating mounting of the steerable rear wheels complicates the problem of adapting a "standard linkage" for steering control of such wheels.

If a steering linkage comprises a rigid rod-like member that extends lengthwise between the steering controller and the floatingly mounted rear wheels, that member must either be connected to the steering linkage on a vertical plane containing the rear axle pivot axis or must be jointed to accommodate up and down tilting of the rear wheel assembly. If the connection is made at the pivot axis, then the steering linkage must include means for accomplishing a rather awkward translation of fore-and-aft lengthwise movements of the rod-like member into swiveling of the rear wheels about their steering knuckles.

In every case a satisfactory mechanical connection between a steering controller at the front of the chassis and steerable rear wheels must meet other requirements. It should be located along parts of the chassis where it will not be in the way of a person using the machine or working around it and will not be disturbed by shrubbery or the like brushing against the machine during mowing. Thus, it should preferably be located wholly at the underside of the chassis, but at a level high enough to avoid entanglement with tall grass, weeds and the like. However, this desirable location is one that is already occupied to a substantial extent by transmission means for connecting the engine with the traction wheels and with the mower, and by other parts of the machine. The steering linkage or connection obviously should not interfere with these other parts of the machine. Needless to say, it should be simple, sturdy and reliable as well as inexpensive.

Apparently it has not been obvious to those skilled in the art how to meet all of these requirements, since the applicant knows of no disclosure of a front wheel drive mower chassis having floatingly mounted steerable rear wheels wherein steering of the rear wheels was controlled other than hydraulically. The absence of such a machine is not due to lack of incentive for providing it. The maneuverability of a front drive-rear steered machine is well known, the importance of floatingly mounting the steerable wheels is also well known, and the cost advantages of a simple mechanical connection over a hydraulic system are obvious.

SUMMARY OF THE INVENTION

The general object of this invention is to provide, in a riding mower chassis to which a front mounted mower is attachable and which has front traction wheels, a simple, reliable and inexpensive connection between a steering wheel at the front of the chassis and floatingly mounted steerable rear wheels.

Thus, it is also an object of the invention to provide a riding mower chassis to which a front mounted mower is attachable and which has the extreme maneuverability attainable with front traction wheels and steerable rear wheels but has greater stability on sloping terrain than a tricycle-type chassis with castered rear wheels and is substantially less expensive than machines that rely on hydraulic control of steering.

A more specific object of the invention is to provide, in a machine of the character described, an inexpensive mechanical connection between a front steering wheel or similar steering controller and floatingly mounted steerable rear wheels, said connection being so arranged along the underside of the chassis that it has no tendency to become entangled with persons and objects near the machine and avoids interference with power transmission systems and other parts that are located at the underside of the chassis.

These and other objects of the invention that will appear as the description proceeds are achieved in a riding mower chassis comprising a frame that has laterally opposite sides and is supported at a front end portion thereof by laterally opposite front traction wheels and at a rear portion thereof by rear wheels, attachment means at the front portion of the frame for connection thereto of a mower that is disposed in front of the traction wheels, an engine mounted on the frame between said portions thereof, an operator's seat supported over the engine, a steering controller mounted on the frame for movement in a pair of opposite actuating directions and accessible from the seat for manual actuation, and transmission means on said chassis for drivingly connecting the engine with said traction wheels and with a mower connected to said attachment means. The riding mower chassis of this invention is characterized by an elongated rear axle that extends laterally in relation to the frame, said axle being pivotally connected to the frame for swinging relative thereto about a fore-and-aft extending swinging axis that is intermediate the ends of the axle and between the sides of the frame, and said axle having a rear wheel mounted on each of its end portions for rotation and for swiveling relative to the axle in opposite steering directions about an upright steering axis. A further characterizing feature resides in cable means comprising a pair of cable stretches, one for each of said actuating directions, each having a rear end near said axle and having at a front end of it a connection with said steering controller whereby it is drawn lengthwise forward by motion of the steering controller in its actuating direction. Said axle has linkage means thereon to which the rear ends of said cable stretches are connected and whereby the rear wheels are constrained to unison swiveling in one steering direction upon lengthwise forward movement of one cable stretch and in the opposite steering direction upon lengthwise forward movement of the other cable stretch. Fixed guide means on the frame, in forwardly spaced relation to said axle, are slidingly engaged by portions of said cable means and laterally confine the same to be guided lengthwise past said transmission means in spaced relation thereto.

Preferably the fixed guide means on the frame comprises a pair of bent tubes, through which the cable stretches slidingly extend and which guide the cable stretches obliquely laterally and rearwardly away from an upright shaft that comprises the steering controller, thence rearwardly along the sides of the frame towards the rear axle.

Other characterizing features of the invention will appear as the description proceeds.

BRIEF DESCRIPTION OF THE DRAWINGS

In the accompanying drawings, which illustrate what is now regarded as a preferred embodiment of the invention:

FIG. 4 is a view looking upward at the chassis from beneath it;

FIG. 5 is a detail view in vertical section showing the connections of the steering control cables to the steering wheel shaft;

FIG. 8 is an exploded perspective view of the rear portion of the chassis frame in relation to the rear axle and the structure for controlling swiveling of the rear wheels about their steering knuckles;

FIG. 9 is a fragmentary perspective view of a portion of the steering cable guide means; and FIG. 10 is a fragmentary perspective view of one end portion of the rear axle and its associated steering control linkage.

DETAILED DESCRIPTION OF PREFERRED EMBODIMENT OF THE INVENTION

Figure 1:
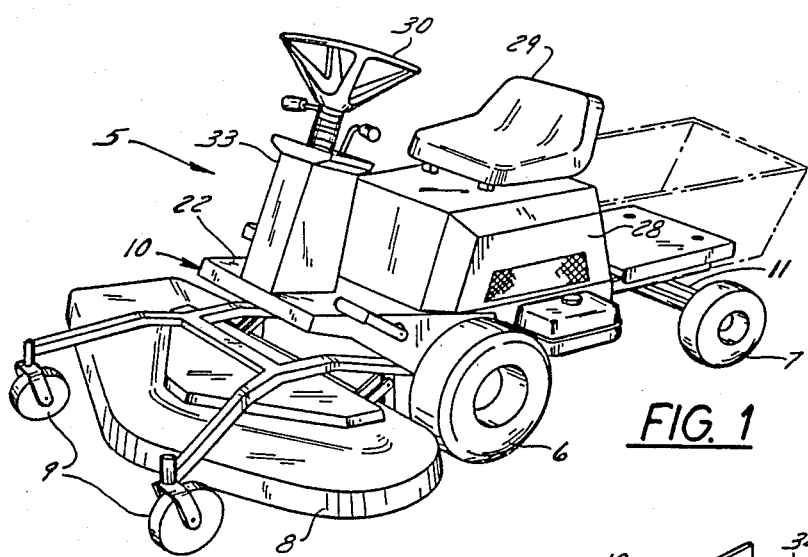
FIG. 1 is a perspective view of a riding mower chassis embodying the principles of this invention, with a front mounted mower attached thereto.

A riding mower chassis 5 of this invention has laterally opposite front propulsion wheels 6 and laterally opposite steerable rear wheels 7. At its front the chassis has attachment means (not shown) for securing to it a mower 8 that rides in front of the front wheels 6. The mower 8 is supported at its rear by its connection with the chassis 5 and at its front by a pair of castering roller wheels 9.

Figure 2:
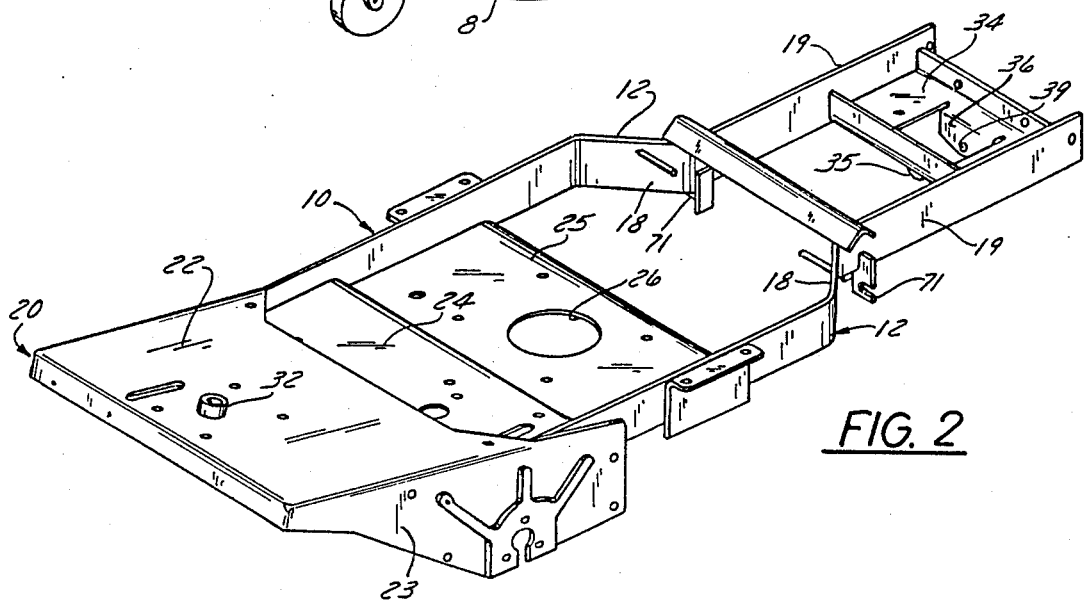
FIG. 2 is a perspective view of the frame of the chassis shown in FIG. 1.
Figure 3:
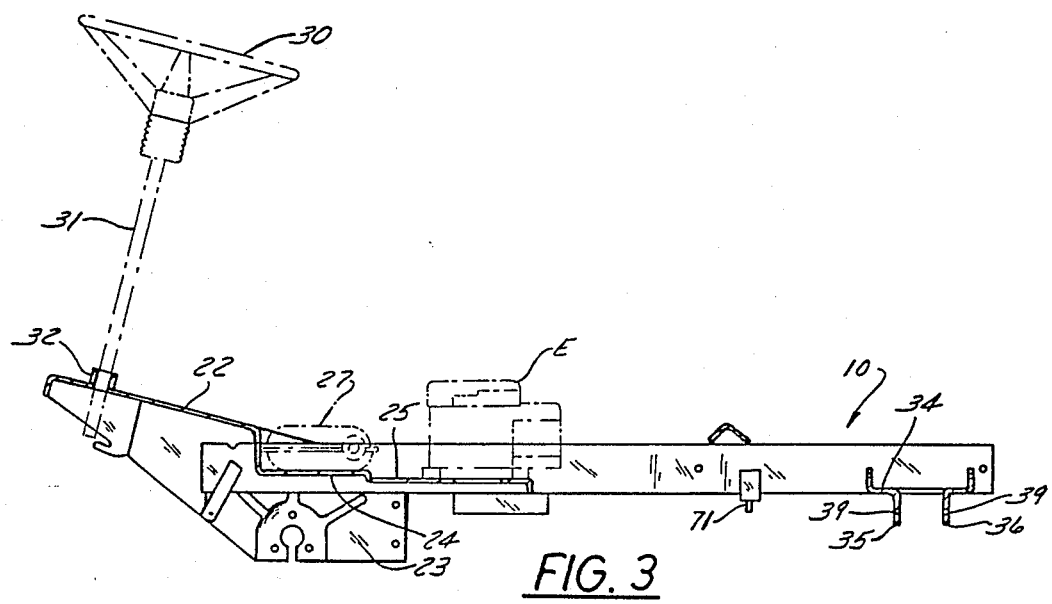
FIG. 3 is a view of the frame in side elevation.
Figure 6:
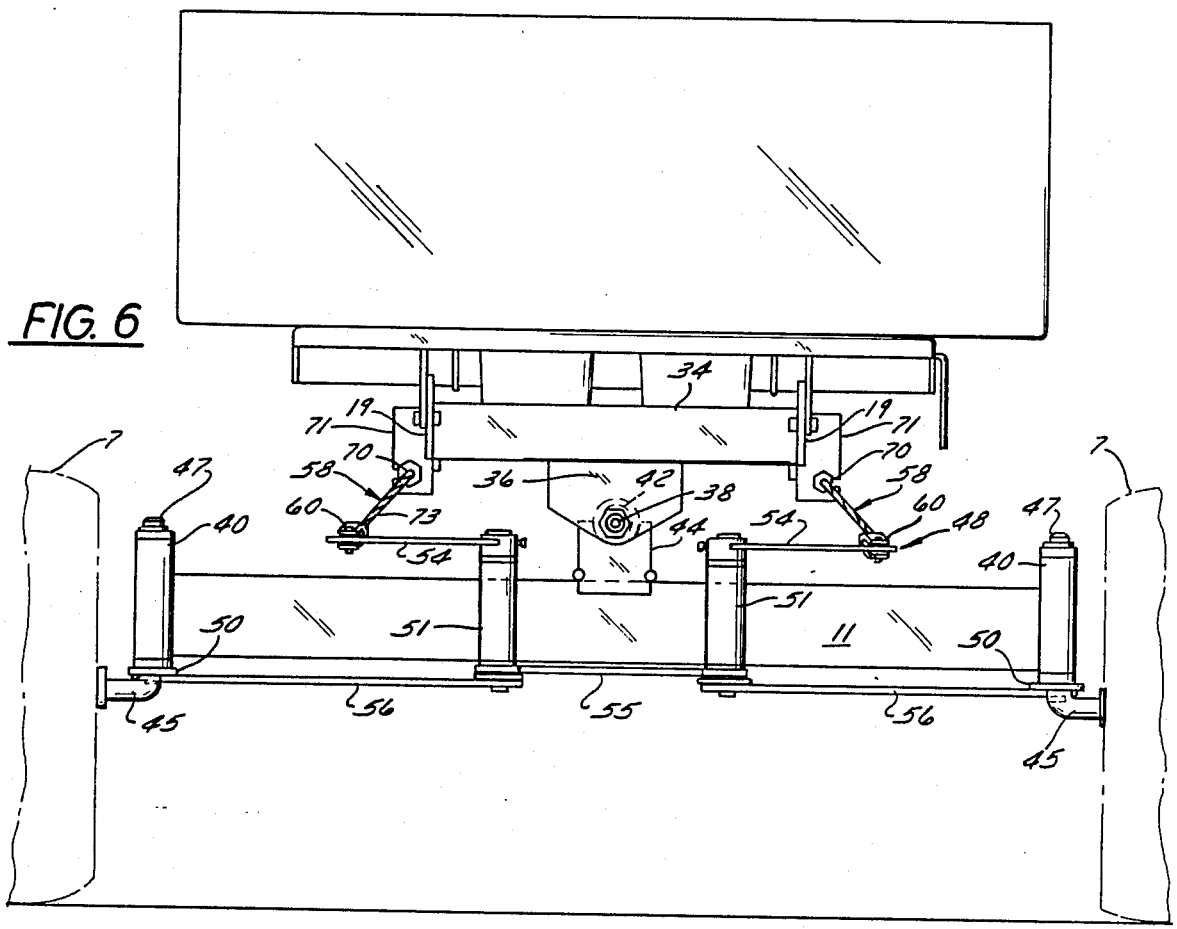
FIG. 6 shows the lower part of the chassis in rear elevation.
Figure 7:
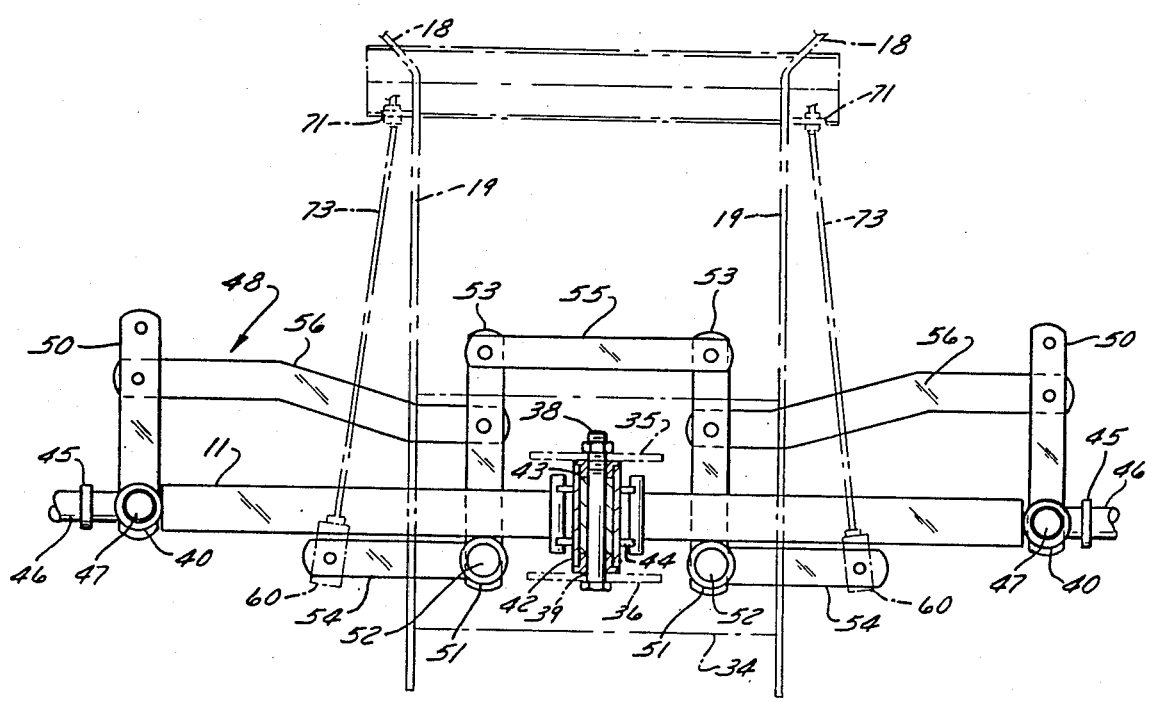
FIG. 7 is a detail view of the rear portion of the chassis, taken on a horizontal plane containing the swinging axis defined by the pivot connection between the rear axle and the chassis frame.

The chassis 5 has a rigid and sturdy frame 10, (shown in its entirety in FIGS. 2 and 3) that is elongated in a fore-and-aft direction and can be substantially symmetrical to a vertical plane which extends fore-and-aft and which thus contains the longitudinal centerline of the chassis. The steerable rear wheels 7 are mounted on opposite ends of a rear axle 11 that is swingable relative to the frame 10 about a longitudinal axis contained in the plane of symmetry.

The frame comprises, in general, a pair of laterally opposite unflanged beams 12 which extend along substantially the full length of the chassis. Through the front portion of the frame and most of its medial portion these beams 12 are straight and parallel to one another, but at the rear of the medial portion they are bent to have laterally oblique segments 18 that extend rearward in convergent relation to one another, so that the rear segments 19 of the two beams, which are straight and parallel, are laterally spaced apart by a substantially smaller distance than their longer front portions.

The front and medial portions of the beams 12 ar bridged by a heavy sheet-metal stamped member 20 that is disclosed in detail in the co-pending application U.S. Ser. No. 47,717, filed May 7, 1987; U.S. Pat. No. 4,726,440, entitled "Unitized Frame for a Self-Propelled Lawn Mower", which has a common assignee with this application. For purposes of understanding the present invention, it is sufficient to note that the stamping 20 has a forwardly and upwardly inclined front portion 22 that serves as a footrest for an operator, downwardly bent side portions 23 which overlie the laterally outer surfaces of the beams 12 and provide for support of an axle (not shown) for the front wheels 6, a flat, horizontal middle portion 24 which is stepped down in relation to the front footrest portion 22, and a further stepped down rear portion 25 which is located about midway between the front and rear ends of the chassis. On the rear portion 25 of the stamping 20 is mounted an engine E which drives the front traction wheels 6 and powers the mower 8 and which has a vertical crankshaft that projects down through a hole 26 in the stamping 20. The flat middle portion 24 of the stamping 20 supports a gear transmission 27 through which the engine drives the front wheels.

The engine E is partially enclosed by an engine housing 28 which is mounted on the medial portion of the chassis and which supports an operator's seat 29 that is over the engine. At the front of the chassis is a steering wheel 30 for steering control of the rear wheels 7, secured to the top of a rotatable substantially upright steering wheel shaft 31 at the front of the chassis. The steering shaft has its bottom end portion beneath the footrest portion 22 of the stamping 20, and it extends upwardly through a tube 32 which is fixed to that portion of the chassis. Surrounding the steering wheel shaft along most of its height and cooperating with the tube 32 to hold it upright and confine it to rotation is a pedestal-like housing 33 on which levers for control of the engine and the gear transmission 27 are accessible to the operator.

Near the rear end of the frame a sturdy sheet metal stamping 34 extends between the rear segments 19 of the beam 12 and is welded or otherwise secured to both of them to unify them into a rigid and sturdy rear frame structure. For details of this stamping 34 and its cooperation with other parts of the chassis, reference may be made to the co-pending application U.S. Ser. No. 47,931, filed May 7, 1987, entitled "Riding Mower Chassis Having Improved Rear Portion", which is assigned to the assignee of this application. On the rear stamping 34 there are flat front and rear lugs 35, 36 which project edgewise downward and extend edgewise laterally and which provide for the swingable connection of the rear axle 11 to the frame whereby the rear wheels 7 are mounted for limited up and down displacement relative to the frame to accommodate irregularities in terrain traversed by the machine.

The rear axle 11 can comprise an unflanged beam of rectangular cross-section that has its longer transverse dimension upright and has an upright tubular socket 40 fixed to each of its ends. The connection between the rear axle and the frame comprises a pivot bolt 38 that extends through coaxial holes 39 in the lugs 35, 36, each said hole being centered in its lug a little above the bottom edge thereof. Secured to the top of the axle 11 midway between its ends is a fore-and-aft extending tube 42 in which there is a rotatable bushing 43 wherein the pivot bolt 38 is received with a close fit. For stability, the distance between the lugs 35, 36 is substantially greater than the fore-and-aft thickness of the axle 11, and the tube 42, which is of a length to fit closely between the lugs, is secured to the axle by means of a bracket structure 44.

Each of the rear wheels 7 is connected with the axle 11 by means of an L-shaped member 45 that comprises a horizontal spindle leg 46 on which the wheel is rotatable and an upright trunnion leg 47 that is swivelably received in the tubular socket 40 on an end of the axle, to provide for steering movements of the wheel. Such swiveling is controlled by steering cable means, described below, connected between the steering wheel shaft 31 and a steering linkage 48 on the axle whereby steering inputs from the cable means are imposed upon the two rear wheels 7 and whereby those wheels are constrained to swivel in unison, both in the same direction.

The steering linkage 48 comprises a steering arm 50 on each of the L-shaped members 45, beneath the socket tube 40, fixed to the upright trunnion leg 47 and projecting generally forwardly at right angles to the spindle leg 46. Fixed to the rear of the axle 11, spaced small and equal distances to opposite sides of the pivot tube bracket 44, are a pair of upright tubular fulcrum sockets 51, in each of which a shaft 52 of a crank lever 53 is pivoted. Each crank lever further comprises a lower arm 53 that is fixed to the bottom of its shaft 52 and projects generally forward therefrom beneath the axle 11, and an upper arm 54 which is fixed to the top of its shaft 52 to be at a level above the axle and which projects generally in a laterally outward direction and extends at right angles to the lower arm 53. At their free forward ends the lower arms 53 are connected by a transversely extending link 55 which has a pivotal connection with each of them and which constrains them to swing in unison, both in the same direction, about their fulcrum shafts 52. Each of the lower crank lever arms 53 is also connected, by means of a laterally extending link 56, with its adjacent steering arm 50. Through the links 55, 56 in their pivot connections to the forwardly projecting arms 50 and 53, the two rear wheels 7 are constrained to swivel in unison, both in the same steering direction. It will be understood that the pivot connections between the links 56 and the respective arms 50 and 53 can be arranged in such relationship to the axes of the upright tubular sockets 40, 50 as to provide for differential swiveling of the wheels that accommodates the difference in turning radii tracked by the two rear wheels during turning.

The cable means whereby swiveling of the rear wheels is controlled from the steering wheel 30 at the front of the chassis comprises a pair of cable stretches 58, each having at a front end thereof a connection 59 with the steering shaft 31 and at a rear end thereof a clevis connection 60 with the free end of one of the upper crank lever arms 54. Because the lever arms project laterally in opposite directions, lengthwise forward displacement of each cable stretch 58, acting through the linkage 48, swivels the rear wheels in an appropriate steering direction and effects a corresponding lengthwise rearward displacement of the other cable stretch.

To provide for the connections 59 of the front ends of the cable stretches 58 to the steering wheel shaft 31 the latter has secured to its bottom end portion a pair of sheaves 62, one above the other, and each cable stretch has its front end secured to one of the sheaves in a known manner and has at least one turn around the sheave to which it is secured. Obviously, a joystick or the like could be used as the steering controller, but a steering wheel will be preferred in most cases.

From their connections with the steering wheel shaft 31 to the rear portion of the frame the cable stretches 58 are disposed at the underside of the chassis frame, at about the level of the bottom surfaces of the frame beams 12. Also disposed at the underside of the frame are belt transmissions, as shown in FIG. 4, comprising a dual pulley 64 on the engine crankshaft, a belt 65 connecting that pulley with a driven pulley 66 on the gear transmission, and another belt 67 that provides for driving the mower from the engine pulley 64. Also disposed at the underside of the frame is a belt tightening clutch system 68 that cooperates with the respective belts 65 and 67 and a chain drive 68 that connects the gear transmission 27 with a front axle 70 to which the traction wheels 6 are fixed. Obviously there must be no interference between the cable stretches 58 and any of these other parts that are located at the underside of the frame.

To guide the cable stretches 58 and hold them spaced clear of all other parts on the underside of the chassis, each cable stretch is lengthwise slidably confined in a rigid guide tube 66 that extends along the underside of the frame from a little behind the steering wheel shaft 31 to the rear end of an oblique segment 18 of a frame beam 12. Each guide tube 66 has a ferrule 67 at its front end that is secured in a small bracket 68 fixed to the underside of the footrest portion 22 of the front stamping 20, a short distance behind the steering shaft. From this bracket the guide tubes 66 extend obliquely rearward and laterally outward in divergent relation to one another, then curve to have long, straight and parallel rearwardly extending portions disposed at opposite sides of the transmissions. The rearmost portion of each guide tube crosses under the oblique segment 18 of its adjacent beam 12 near the rear end of that segment and terminates at a rear ferrule 70 which is secured to a small downwardly and laterally outwardly projecting bracket 71 that is fixed to the beam a little behind its oblique segment. The rear portion 73 of each cable stretch, extending from the rear end of its guide tube to the crank lever arm 54, is laterally unconfined and is thus free to swing up and down, by flexing, to accommodate the "floating" up and down movements of the rear wheels.

From the foregoing description taken with the accompanying drawings, it will be apparent that the invention provides a riding chassis for a front mounted mower, having front traction wheels and floatingly mounted steerable rear wheels and having simple, inexpensive, compact and reliable mechanical means for connecting a steering wheel at the front of the chassis with a linkage that controls swiveling of the rear wheels about their steering knuckles.

What is claimed as the invention is:

1. A riding mower chassis comprising a frame that has laterally opposite sides and is supported at a front portion thereof by laterally opposite traction wheels and at a rear portion thereof by rear wheels, attachment means on the front portion of the frame for connection thereto of a mower that is disposed in front of the traction wheels, an operator's seat on the frame that is spaced to the rear of the front end thereof, a steering controller in front of said seat that is mounted on the frame for movement in a pair of opposite actuating directions, ad engine mounted on the frame, an transmission means on said chassis in front of said rear wheels for drivingly connecting the engine with said traction wheels and with a mower connected to said attachment means, said riding mower chassis being characterized by:
   A. an elongated rear axle that extends laterally in relation to the frame,
     (1) said axle being pivotally connected to the frame for swinging relative thereto about a fore-and-aft extending swinging axis that is intermediate the ends of the axle and between the sides of the frame, and
     (2) said axle having a rear wheel mounted on each of its end portions for rotation and for swiveling relative to the axle in opposite steering directions about an upright steering axis;
   B. cable means comprising a pair of cable stretches, one for each of said steering directions, each having a rear end near said axle and having at a front end of it a connection with said steering controller whereby it is drawn lengthwise forward by motion of the steering controller in one of its actuating directions;
   C. linkage means on said axle and connected to said rear wheels to which the rear ends of said cable stretches are connected and whereby said rear wheels are constrained to unison swiveling in one steering direction upon lengthwise forward movement of one cable stretch and in the opposite steering direction upon lengthwise forward movement of the other cable stretch; and
   D. fixed guide means on the frame, in forwardly spaced relation to said axle and rearwardly of said transmission means, whereby portions of said cable means are slidingly engages and laterally confined to be guided lengthwise past said transmission means in spaced relation to the same and whereby other portions of said cable means are unconfined and able to flex as said rear axle swings.

2. The riding mower chassis of claim 1 wherein said fixed guide means comprises a length of rigid tubing for each cable stretch through which the cable stretch extends and which is secured to the underside of the frame, each said length of tubing having a rear end which is in forwardly spaced relation to said axle from which an unconfined portion of a cable stretch extends.

3. The riding mower chassis of claim 1, further characterized by:
   (1) an L-shaped member for each of said rear wheels whereby the rear wheel is mounted on said axle for rotation and for swiveling relative to the chassis, each said L-shaped member having (a) a substantially horizontal leg on which its wheel is rotatably mounted, and (b) an upright leg received in a tubular socket on the axle for rotation about said steering axis;

(2) a steering arm fixed on each L-shaped member an extending substantially perpendicularly to both of its legs; and (3) said linkage means comprising (a) a pair of crank levers that are connected with said axle to swing relative thereto about respective upright lever axes which are spaced substantially equal distances to opposite sides of said swinging axis, each said crank lever having (1) a first arm which projects substantially laterally and away from the other crank lever and to which one of said cable stretches is connected, and (2) a second arm which projects in one of said fore-and-aft directions, and (b) link means connecting said second arm of each crank lever with its adjacent steering arm and with the second arm of the other crank lever.

4. A riding mower chassis comprising a frame that has laterally opposite sides and is supported at a front portion thereof by laterally opposite traction wheels and at a rear portion thereof by rear wheels, attachment means on the front portion of the frame for connection thereto of a mower that is disposed in front of the traction wheels, an operator's seat supported on said frame in rearwardly spaced relation to the front end thereof, a steering controller movably mounted on the frame in front of said seat, and engine mounted on the frame, and transmission means on said chassis in front of said rear wheels for driving connecting the engine with said traction wheels and with a mower connected to said attachment means, said riding mower chassis being characterized by:

A. an elongated rear axle that extends laterally in relation to the frame;

B. pivot means connecting said axle with the rear portion of the frame and confining the axle to swinging relative to the frame about a fore-and-aft extending swinging axis that is intermediate the ends of the axle and between the sides of the frame;

C. a spindle member on each end portion of said axle, each said spindle member having one of the rear wheels rotatably mounted thereon and being confined to swiveling relative to the axle in opposite steering directions about a substantially upright axis;

D. linkage means on said axle, (1) said linkage means comprising a pair of cable connection elements which are spaced to opposite sides of said swinging axis and each of which (a) is confined to substantially forward and rearward movement relative to said axle, an (b) is constrained to move rearward upon forward movement of the other, and (2) said linkage means having connections with said spindle members whereby they are both swiveled in one steering direction by forward movement of one of said cable connection elements and in the opposite steering direction by forward movement of the other one;

E. cable means comprising a pair of cable stretches, each having (1) a rear end connected with one of said cable connection elements, and (2) a front end connected with the steering controller by a connection so that actuation of the steering controller in one of a pair of opposite actuating directions draws the cable stretch lengthwise forward and its actuation in the other of those directions slacks the cable stretch for lengthwise rearward displacement; and F. fixed guide means on the frame in forwardly spaced relation to said axle and whereby portions of said cable means are slidingly engaged and laterally confined to be guided lengthwise past said transmission means in spaced relation to the same and other portions of said cable means are unconfined and able to flex.

5. The riding mower chassis of claim 4 wherein said steering controller comprises an upright rotatable shaft having a steering wheel secured to its upper end and having a lower end portion which is at the underside of the frame and to which said cable stretches are secured at their front ends, and wherein said fixed guide means comprises a pair of rigid tubes at the underside of the frame through each of which one of said cable stretches lengthwise slidingly extends and which are arranged to guide the cable stretches obliquely laterally and rearwardly away from said lower end portion of the shaft, thence rearwardly along the sides of the frame towards the rear axle, said portions of said cable stretches extending outwardly of the rear of said tubes being unconfined and able to flex.

6. A riding mower chassis that has laterally opposite traction wheels at its front portion and at its rear portion has a pair of rear wheels, an operator's seat on the chassis, a controller in front of said seat that is mounted on the chassis for movement in a pair of opposite actuating directions, said riding mower chassis being characterized by:

A. an elongated rear axle that extends laterally in relation to the chassis, (1) said axle being pivotally connected to the chassis for swinging relative thereto about a fore-and-aft extending swinging axis, and (2) said rear axle having a rear wheel mounted on each of its end portions for rotation and for swiveling relative to the axle about an upright steering axis;

B. shielded cable means including a pair of cable stretches, slidingly encased in tubular jackets which are fixed on and longitudinally along said chassis, one cable means for each of said actuating directions, each cable stretch having an uncased unconfined flexible rear end near said axle and having at a front end of it a connection with said steering controller whereby it is drawn lengthwise in its jacket forward by motion of the steering controller in one of its actuating directions;

C. linkage means on said rear axle and connected to said rear wheels to which the rear ends of said cable stretches are connected and whereby said rear wheels are constrained to unison swiveling in one steering direction upon lengthwise forward movement of one cable stretch and in the opposite steering direction upon lengthwise forward movement of the other cable stretch within its jacket.

7. The riding mower chassis of claim 6, further characterized by:

(1) an L-shaped member for each of said rear wheels whereby the rear wheel is mounted on said axle for rotation and for swiveling relative to the chassis, each said L-shaped member having
   (a) a substantially horizontal leg on which its wheel is rotatably mounted, and
   (b) an upright leg received in a tubular socket on the axle for rotation about said steering axis; and
(2) a steering arm fixed on each L-shaped member and extending substantially perpendicularly to both of its legs.

8. The chassis set forth in claim 6 further characterized in that said linkage means comprises
(a) a pair of crank levers that connected with said axle to swing relative thereto about respective upright lever axes which are spaced substantially equal distances to opposite sides of said swinging axis, each said crank lever having
   (1) a first arm which projects substantially laterally and away from the other crank lever and to which one of said cable stretches is connected, and
   (2) a second arm which projects in one of said fore-and-aft directions, and
(b) link means connecting said second arm of each crank lever with its adjacent steering arm and with the second arm of the other crank lever.

9. A riding mower chassis comprising a frame that has laterally opposite sides and is supported at a front portion thereof by laterally opposite traction wheels and at a rear portion thereof by rear wheels, attachment means on the front portion of the frame for connection thereto of a mower that is disposed in front of the traction wheels, an operator's seat on the frame that is spaced to the rear of the front end thereof, a steering controller in front of said seat that is mounted on the frame for movement in a pair of opposite actuating directions, an engine mounted on the frame, and transmission means on said chassis in front of said rear wheels for drivingly connecting the engine with said traction wheels and with a mower connected to said attachment means, said riding mower chassis being characterized by:

A. an elongated rear axle that extends laterally in relation to the frame,
   (1) said axle being pivotally connected to the frame for swinging relative thereto about a fore-and-aft extending swinging axis that is intermediate the ends of the axle and between the sides of the frame, and
   (2) an L-shaped member on said axle for each of said rear wheels whereby a rear wheel is mounted on each of the axle end portions for rotation and for swiveling relative to the axle and to chassis in opposite steering directions about an upright steering axis, each said L-shaped member having
      (a) a substantially horizontal leg on which its wheel is rotatably mounted, and
      (b) an upright leg received in a tubular socket on the axle for rotation about said steering axis;
   (3) a steering arm fixed on each L-shaped member and extending substantially perpendicularly to both of its legs; and B. cable means comprising a pair of cable stretches, one for each of said actuating directions, each having a rear end near said axle and having at a front end of it a connection with said steering controller whereby it is drawn lengthwise forward by motion of the steering controller in one of its actuating directions;

C. linkage means on said axle and connected to said rear wheels to which the rear ends of said cable stretches are connected and whereby said rear wheels are constrained to unison swiveling in one steering direction upon lengthwise forward movement of one cable stretch and in the opposite steering direction upon lengthwise forward movement of the other cable stretch;
   (1) said linkage means comprising
      (a) a pair of crank levers that are connected with said axle to swing relative thereto about respective upright lever axes which are spaced substantially equal distances to opposite sides of said swinging axis, each said crank lever having
         (1) a first arm which projects substantially laterally and away from the other crank lever and to which one of said cable stretches is connected, and
         (2) a second arm which projects in one of said fore-and-aft directions, and
      (b) link means connecting said second arm of each crank lever with its adjacent steering arm and with the second arm of the other crank lever; and D. fixed guide means on the frame, in forwardly spaced relation to said axle and rearwardly of said transmission means, whereby portions of said cable means are slidingly engaged and laterally confined to be guided lengthwise past said transmission means in spaced relation to the same.

10. The riding mower chassis of claim 9 wherein said fixed guide means comprises a length of rigid tubing for each cable stretch through which the cable stretch extends and which is secured to the underside of the frame, each said length of tubing having a rear end which is in forwardly spaced relation to said axle.

11. A riding mower comprising:
a rigid frame;
a floating axle mounted on said frame so as to be floatably movable relative to said frame;
a steerable wheel mounted on said floating axle;
linkage means mounted on said floating axle and movable thereon to effect steering motion of said steerable wheel;
an actuatably movable steering controller mounted on said frame and spaced from said linkage means;
cable means comprising a flexible cable stretch connected between said steering controller and said linkage means, said cable being axially movable in response to an actuating movement of said steering controller to effect movement of said linkage means and a steering motion of said steerable wheel;
and cable guide means mounted on said frame between said steering controller and said linkage means,
said cable stretch having a first portion which is slidably engaged by and confined against transverse movement by said cable guide means,
said cable stretch having a second portion extending between said cable guide means and said linkage means which is unconfined and is free to flex transversely to accommodate the floating movement of said floating axle effected by corresponding movement of said steerable wheel.

12. A riding mower comprising:
a rigid frame extending in a fore-and-aft direction;
an axle movably mounted on said frame and extending transversely to said fore-and-aft direction, said axle being swingably movable up and down relative to said frame about a longitudinal axis;
steerable wheels mounted on said axle near opposite ends thereof;
linkage means including a pair of crank lever arms mounted on said axle, each crank lever arm being movable in said fore-and-after direction to effect steering of an associated steerable wheel;
a steering controller mounted on said frame and spaced from said lever arms,
said steering controller being movable in opposite actuating directions;
cable means comprising a pair of flexible cable stretches, each cable stretch having one end connected to said steering controller and having its other end connected to one of said crank lever arms;
and cable guide means mounted on said frame between said steering controller and said crank lever arms,
each of said cable stretches having a first portion which is slidably engaged by and laterally confined by said cable guide means,
each of said cable stretches having a second portion extending between said cable guide means and its associated crank lever arm which is laterally unconfined and is free to swing up and down by flexing to accommodate the up and down movement of said axle effected by corresponding movement of said steerable wheels.

* * * * *